(12) United States Patent
Cadeddu

(10) Patent No.: US 7,726,453 B2
(45) Date of Patent: Jun. 1, 2010

(54) COUPLING

(75) Inventor: Leonardo Cadeddu, Crema (IT)

(73) Assignee: VHIT S.p.A. Unipersonale, Offanengo (IT)

( * ) Notice: Subject to any disclaimer, the term of this patent is extended or adjusted under 35 U.S.C. 154(b) by 534 days.

(21) Appl. No.: 11/632,702

(22) PCT Filed: Jul. 19, 2005

(86) PCT No.: PCT/EP2005/007845

§ 371 (c)(1),
(2), (4) Date: Jan. 18, 2007

(87) PCT Pub. No.: WO2006/010528

PCT Pub. Date: Feb. 2, 2006

(65) Prior Publication Data

US 2008/0230343 A1    Sep. 25, 2008

(30) Foreign Application Priority Data

Jul. 30, 2004    (IT) ........................... TO2004A0530

(51) Int. Cl.
*F16D 31/06*    (2006.01)
(52) U.S. Cl. .................................... 192/58.91; 417/319
(58) Field of Classification Search ............... 192/58.9, 192/58.91, 58.92
See application file for complete search history.

(56) References Cited

U.S. PATENT DOCUMENTS

| 693,271 | A | * | 2/1902 | Harding | .................. 192/58.91 |
| 1,917,972 | A | | 7/1933 | Henriot | |
| 2,242,734 | A | * | 5/1941 | Whittlesey | .............. 192/58.92 |
| 2,986,024 | A | | 5/1961 | Power | |
| 4,158,248 | A | * | 6/1979 | Palmer | ........................ 15/321 |
| 4,214,652 | A | * | 7/1980 | Quenneville | ............. 192/58.92 |
| 5,709,540 | A | * | 1/1998 | Cadeddu | ..................... 418/156 |
| 2002/0157414 | A1 | * | 10/2002 | Iwanami et al. | ............... 62/239 |

FOREIGN PATENT DOCUMENTS

| EP | 36 16 515 | 11/1987 |
| EP | 2211918 | 7/1989 |
| EP | 196 28 742 | 1/1998 |
| EP | 197 35 784 | 2/1999 |

* cited by examiner

*Primary Examiner*—Rodney H Bonck
(74) *Attorney, Agent, or Firm*—Young & Thompson

(57) ABSTRACT

A device for controlling the activation of an apparatus by a motor, intended to be inserted between, the operation output of the motor and the operation input of the apparatus whose activation is to be controlled. The device includes: —a blade pump having a rotor, at least one blade carried by this rotor and a rotary body forming a pumping chamber missing an outlet, and one of the component parts, among the rotor and the rotary body, being connected to the operation output of the motor, whilst the other of these component parts is connected to the operation input of the apparatus to be controlled; —and a supply intended to supply liquid to the pumping chamber.

9 Claims, 3 Drawing Sheets

COUPLING

The subject of the present invention is a device intended for interrupting, at least in part, the activation of an apparatus driven by a motor means, during the periods of time in which the operation of said apparatus is not needed.

In the automotive field are used some pumps, called "vacuum pumps", which usually are blade pumps, and whose purpose is that of generating and maintaining a depression in an air tank. This depression mainly serves for operating the pneumatic brake assisting servomotors, as well as possible other apparatuses which for their operation need to use a depression. After the depression has been initially generated, the operation of these vacuum pumps serves to compensate for the depression consummation effected by the apparatuses connected to the tank, and for the leakages. These apparatuses are not permanently in operation, and the leakages are reduced, whereby there are periods of time, which may have a noticeable duration, during which the operation of the vacuum pump is of no use. Nevertheless, according to the usual technique, the vacuum pumps are permanently driven by the engine. The consequence is a unnecessary power absorption and therefore a useless fuel consummation, as well as a unnecessary wear of the pump component parts.

The activation of the vacuum pump only when its operation is required would allow reducing the total power requested to the engine and therefore the fuel consummation, as well as reducing the wear of the component parts and therefore increasing their duration in use, in addition also making possible the choice of alternative, less costly, materials for manufacturing the pump component parts, in view of their reduced stress.

In addition to the typical application mentioned above, there are in the technique other cases in which the operation of a motor driven apparatus is only useful during some periods of time in which particular circumstances take place, whereas its operation is superfluous during other periods of time, wherein the apparatus could be kept inactive, thus avoiding power absorption and wear. As examples of such cases may be mentioned, for the motor vehicles, the pump for the engine refrigerating fluid, the pump for the steering servomotor, the electric generator and the pneumatic compressor for trucks. The invention could also find application to the pump for lubricating oil, the combined vacuum-oil pump and the low pressure pump for diesel oil, in order to provide a suitably regulated system intended to carry out a sliding, variable according to the need, between the motor driving and the user apparatus, even without completely intercepting the operation of the apparatus.

In view of the above, a main object of this invention is to provide a device suitable for activating the operation of an apparatus only when this operation is really required. Another object of the invention is to carry out the transition from an activation condition to an inactivation condition, and vice-versa, in a gradual manner, such as not to produce harmful stresses. A further object is to attain the stated objects by using relatively simple and reliable means of limited cost.

The object of the invention is attained by a device for controlling the operation of an apparatus by a motor means, intended to be inserted between the operation output connection of said motor means and the operation input connection of said apparatus whose activation is to be controlled, this device being composed by: —a blade pump comprising a rotor, at least one blade carried by said rotor and a rotary body forming the pumping chamber, this pumping chamber being missing an outlet (except the leakages of sealing), and one of the component parts, among the rotor and the rotary body, being connected to the operation output connection of the motor means, whilst the other of these component parts is connected to the operation input connection of the apparatus to be controlled; —and a supply means intended to supply a liquid to said pumping chamber, this supply means being suitable for being put in a first condition in which it supplies liquid to the pumping chamber and in a second condition in which it does not supply liquid to the pumping chamber, as a consequence of the verification of the need, or respectively of the not need, to activate said controlled apparatus.

In its conception, the device has the character of a volumetric pump, per se historically known (see the Oldham-Franchot configuration of the year 1861), the new idea consisting in the suppression of the liquid outlet connection of the pump and the regulation of the liquid outlet through suitable clearances among the moving parts, or through a control valve for the previously mentioned sliding system.

In this way, when liquid is supplied to the pumping chamber and cannot be quantitatively delivered in the absence of an outlet connection, the liquid contained in the pumping chamber constitutes a "hydraulic block" which prevents the relative rotation between the rotor and the rotary body, whereby the blade pump substantially rotates as a solid piece, and it transmits the operation from the motor means to the controlled apparatus. In this first condition, the liquid leakages due to the imperfect sealings or to other causes only allow a very limited rotation between the rotor and the pump rotary body, and this does not modify in a substantial manner the described behavior.

When, on the contrary, no liquid is supplied to the pumping chamber, the liquid therein contained is gradually expelled through the leakages, until the previous hydraulic block is suppressed and a substantially free rotation between the rotor and the rotary pump body is allowed, whereby in this second condition the device behaves as an idle joint and does no more transmit the operation to the controlled apparatus.

It is important to remark that the passage from the driving condition to the non-driving condition, and vice-versa, takes place in a very gradual manner, due to the very limited liquid delivery rate allowed by the leakages, and it does not give rise to any abnormal or impulsive stress. If this is needed, the graduality of this passage may be regulated by suitably proportioning the sealing leakages, and when this appears to be necessary or suitable for a better operation of the device, the sealing leakages may be integrated by little passages provided to this purpose.

The liquid directed to the pumping chamber may be supplied under pressure, or it may be sucked by the pump itself. The condition of non-supply should not be realized as a total supply absence, which could lead to a harmful lubrication absence, but in the sense of a so reduced supply that can be compensated in a substantially complete manner by the sealing leakages.

The device according to the invention can be incorporated in the controlled apparatus itself, or it can constitute an implement to be interposed between the controlled apparatus and its motor means.

In several cases, the liquid intended to operate the device may be the same liquid supplied, for any reason, to the controlled apparatus, and the supply of this liquid is interrupted when needed by, means of a valve. In other cases, a mechanical command may be used for controlling the inlet of liquid into the device.

These and other features, objects and advantages of the subject of the present invention will more clearly appear from the following description of an embodiment, being a non limiting example, and of some modifications thereof, with reference to the accompanying drawings, wherein.

Figure 1:
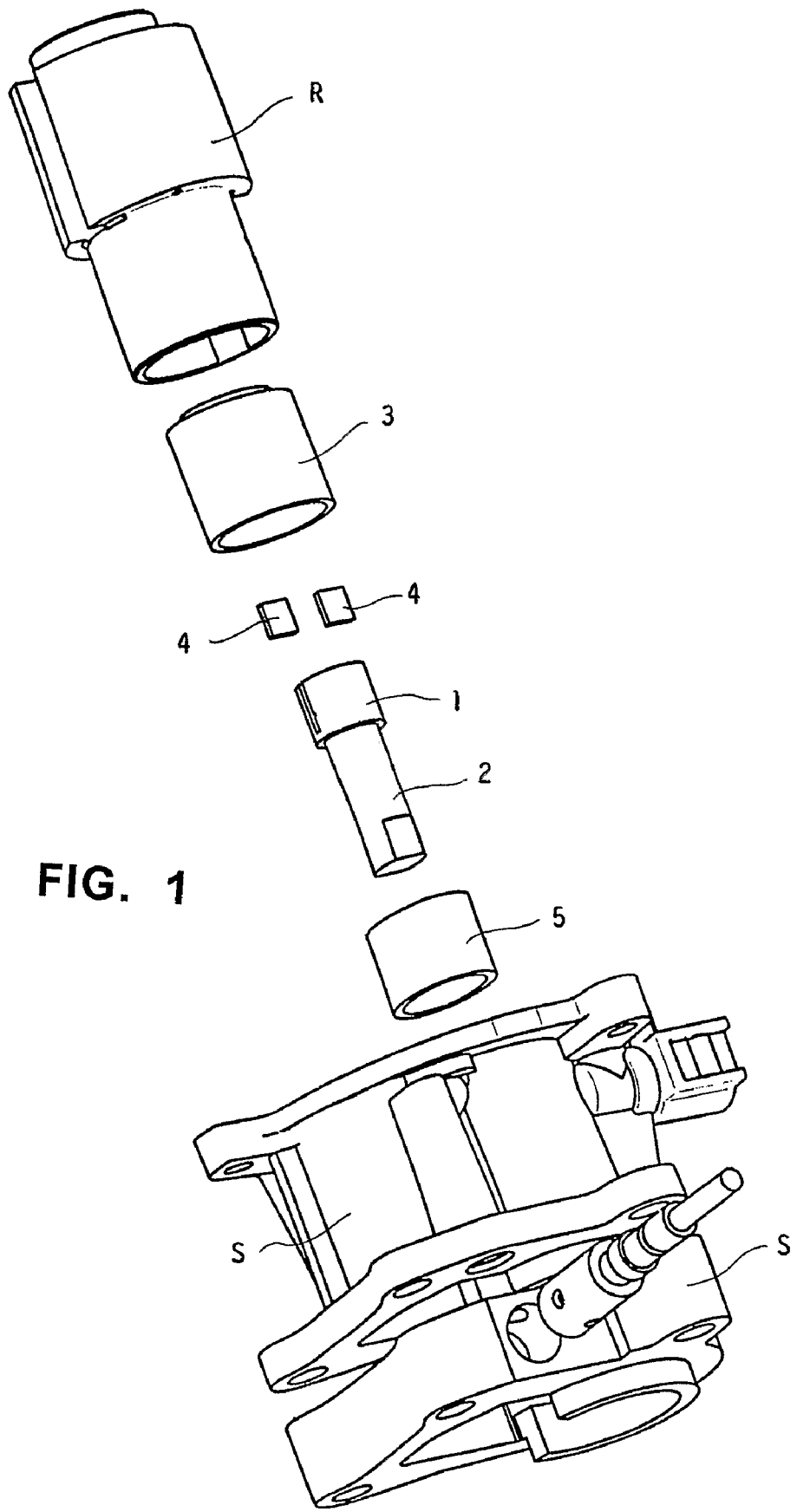
FIG. 1 shows the supporting structure of a vacuum pump, some parts of the pump and the component parts of the device of the invention being represented in exploded view.

The device of the invention is mainly intended for its application in the automotive field to a vacuum pump, and for this reason the following description refers to that application; however, by taking into account the amount of power involved, in order of suitably sizing the device, this latter may be embodied for any other application on a motor driven apparatus whose operation is not permanently required during the operation of the motor.

In those cases in which the encumbrance size allows to do so, the device may be housed inside some parts of the controlled apparatus; this is generally the case in the application of the device to a vacuum pump. In the contrary case, the device may constitute a separate unit, intended to be installed between the power output connection of the motor and the apparatus intended to be controlled by the device.

As already stated, herein the device according to the invention is described and represented as applied to a vacuum pump and housed inside the pump structure. In the drawings, the reference S designates the supporting structure of the vacuum pump, and the reference R designates the rotor of said vacuum pump. These are the only parts of the vacuum pump which have a direct relation with the device of the invention, and therefore the remaining parts of the vacuum pump have not been represented nor described.

The device comprises a rotor 1, which is extended by a shaft 2 intended to be mechanically connected to a motor means M, particularly to the output shaft of the vehicle engine. Around rotor 1 is provided a rotary body 3, which is mechanically connected to the rotor R of the vacuum pump. If suitable, both components R and 3 may also be solid and constitute a sole component part. Rotor 1 of the device carries one or more blades, according to this example two blades 4, cooperating with the inner surface, suitably profiled, of the rotary body 3, which defines the pumping chamber 12. Rotor 1 is kept in position within the rotary body 3 by a ring 5.

It may be remarked that the structure of the device corresponds to the structure of a blade pump, and that the rotary body 3, delimiting the pumping chamber 12, corresponds to the stator of a usual blade pump. As in a usual blade pump, the rotary body 3 has passages 6 for inlet to the pumping chamber 12. To these inlet passages 6 correspond passages 7 formed in the portion of rotor R wherein is mounted the rotary body 3. But, as a difference with respect to a usual blade pump, the rotary body 3 has no outlet opening from the pumping chamber 12.

As a consequence, when liquid is supplied to the inlet openings 6, it fills the pumping chamber 12 and is put under pressure by the blades 4, but it does not find any outlet opening, except the leakages existing in the sealing regions between the blades 4 and the rotary body 3, and between rotor 1 and ring 5. Through these leakages a flow is established, which however is very limited, and to this flow corresponds a relative rotation between rotor 1 and the rotary body 3, this rotation being also very limited. Substantially, the rotary body 3 is driven at nearly the same rotation speed of rotor 1 by the hydraulic block produced by the liquid present, which cannot be expelled from the pumping chamber 12, except through the mentioned leakages. Therefore, the device transmits to rotor R of the vacuum pump the operation applied to shaft 2 by the motor means M to which the shaft 2 is connected.

If, on the contrary, no liquid is supplied to the inlet openings 6, the liquid present in the pumping chamber 12 defined by the rotary body 3 is gradually expelled through the leakages, until the hydraulic block ends and rotor 1 can rotate in a substantially free manner inside the rotary body 3. This latter is no more driven, it stops and with it stops rotor R of the vacuum pump, which is mechanically connected to the rotary body 3. Therefore, the device now behaves as an idle joint.

The passage from the driving condition to the non-driving condition takes place gradually, because the scarce flow allowed by the leakages slows down the emptying of the pumping chamber 12 defined by the rotary body 3. A similar slowing down in the passage from the condition of non-driving to the condition of driving is observed when liquid is again supplied to the device. Therefore the passage from the one condition to the other always takes place without generating sudden or intense stresses, which could damage the component parts.

When this slowing down, due to the limited leakages, is considered excessive, the leakages may be suitably integrated by passage means in any way provided.

Figure 2:
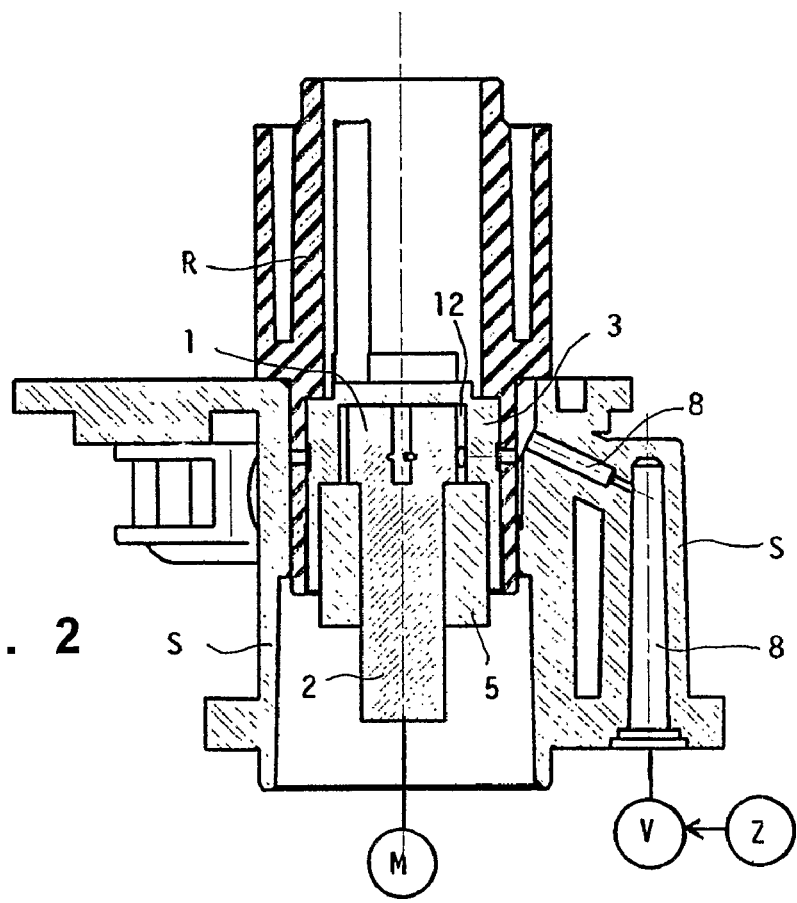
FIG. 2 shows in a longitudinal section some parts of a vacuum pump and the device of the invention, incorporated in the pump structure.

In the practice, the operation of the device may be controlled by supplying or not supplying, through the duct 8 (FIG. 2), pressurized oil, which may be the same oil intended for the lubrication, refrigeration and sealing of the vacuum pump. However, even during those periods of time which are considered of non-supply, in the reality a little quantity of oil will always be supplied, this little quantity being sufficient for ensuring the lubrication of the device and being discharged through the leakages (possibly integrated as stated), without causing a drag of the vacuum pump.

The oil supply may be effected by means of a valve V controlled by a pressure sensor Z (mechanical or electronic) installed upstream the non-return valve with which the vacuum pump is equipped, in any point of the circuit maintained in depression by the vacuum pump, in such a way as to energize the vacuum pump any time the depression drops beneath a predefined level, and to stop the vacuum pump when the depression by it generated attains a pre-established maximum value.

Figure 4:
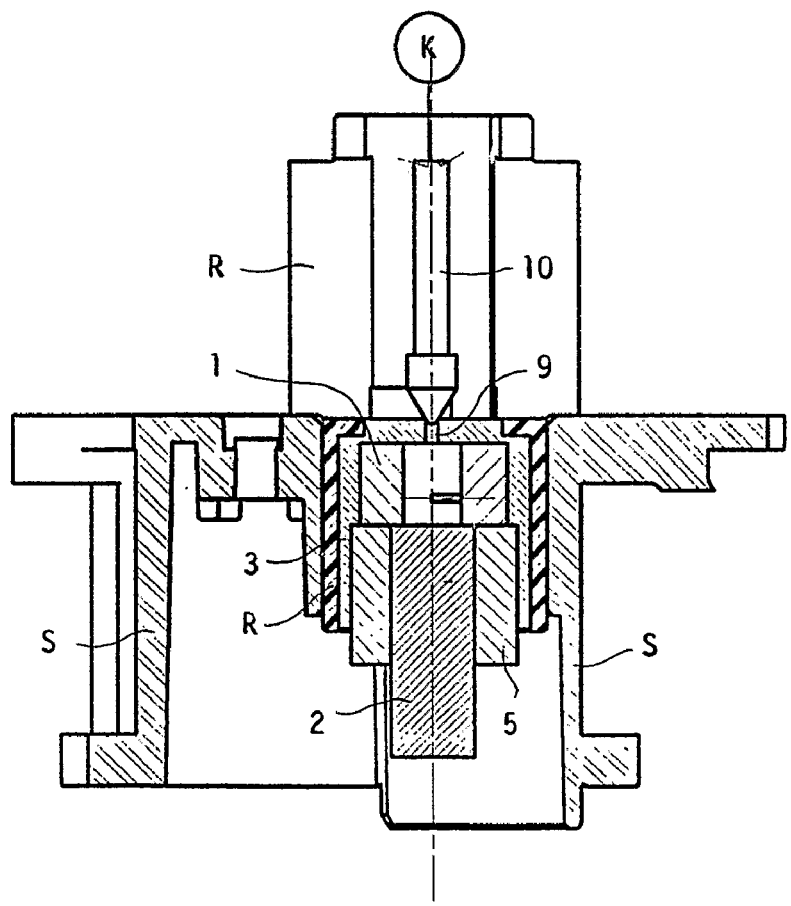
FIG. 4 shows, in a representation similar to that of FIG. 2, a modified embodiment.

As an alternative, by an arrangement as that of FIG. 4, it is possible to provide a shutter 10 (controlled by a mechanical command K) which opens or closes an opening 9 through which the oil lubricating the vacuum pump can be admitted in the pumping chamber 12 delimited by the rotary body 3.

Figure 3:
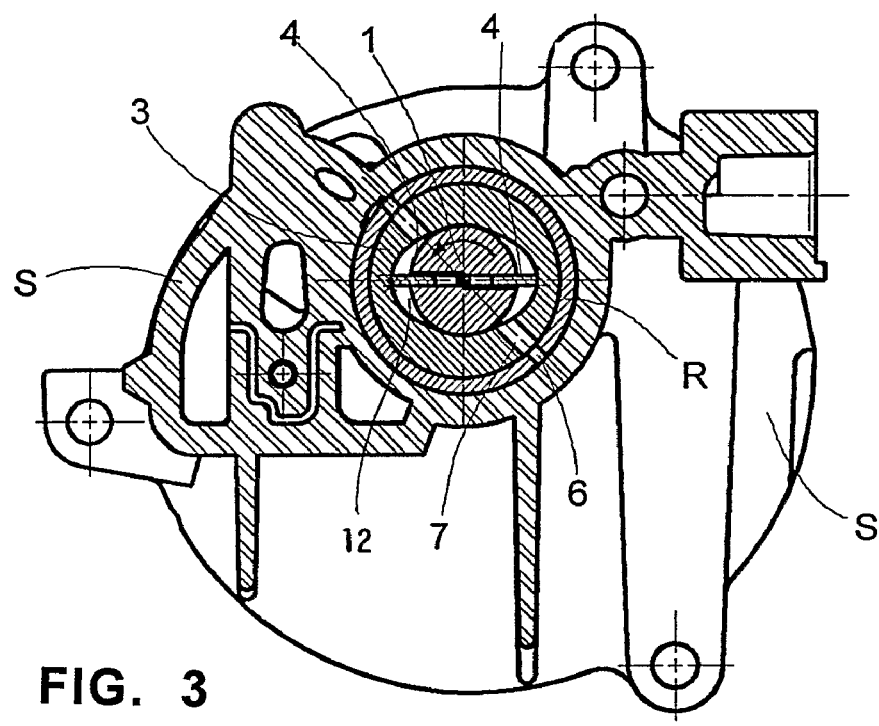
FIG. 3 shows a cross section taken in correspondence of the rotor of the device of the invention.
Figure 5:
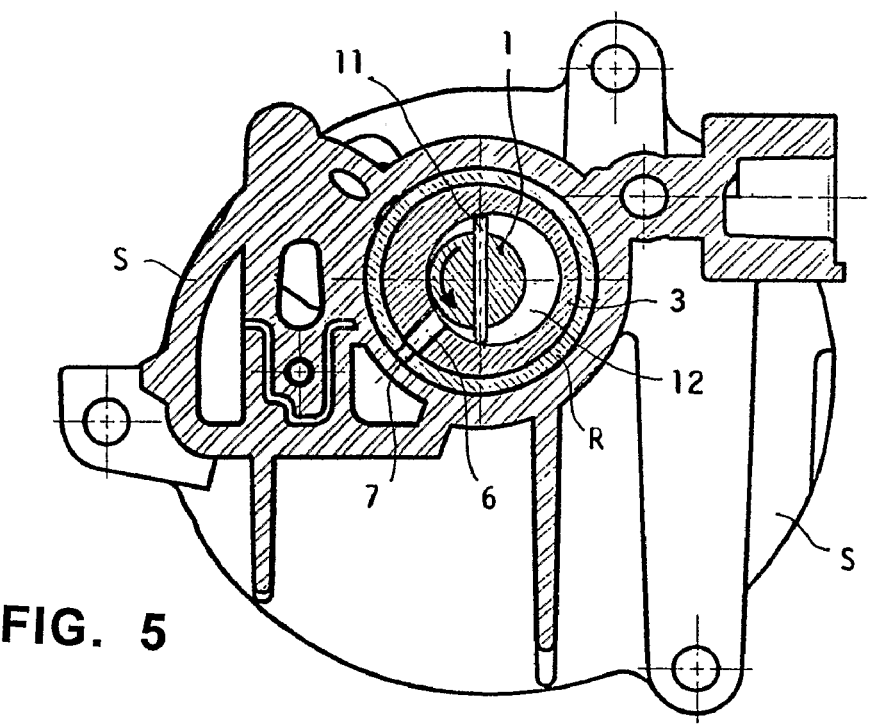
FIG. 5 shows, in a representation similar to that of FIG. 3, another modified embodiment.

In the embodiment according to FIG. 3, as already stated, the rotor 1 carries two blades 4 which, pushed by the centrifugal force, by the oil pressure or, possibly, by pushing springs, follow the internal outline of the pumping chamber 12 delimited by the rotary body 3. However, on the contrary, as represented in FIG. 5, rotor 1 can be provided with a single blade 11, whose end portions are permanently in contact with the inner outline, suitably designed, of the rotary body 3.

In the case of the version provided with a single blade 11, the inner outline of the pumping chamber 12 has a nearly elliptic shape; this outline is determined by fixing the points of passage of the end portions of the blade 11 when this latter is in the position according to FIG. 3 and in the position orthogonal thereto. The outline of the chamber 12 is designed by marking the trajectory followed by the end portions of the blade 11 during the translation thereof in the seat provided in the rotor 1 for the blade 11, in correspondence of a complete rotation of rotor 1. The outline is chosen in order to give rise to a constant clearance between the blade 11 and the outline of chamber 12. The barycenter of the elliptic chamber 12 is in a position eccentric with respect to the rotation center of the rotary body 3, in order that the rotation axis of the rotary body 3 corresponds to the axis of rotor 1.

In effect, it is needed for the device according to the invention that it substantially corresponds to a volumetric pump about missing an outlet, whose elements are connected the one to a motor means and the other to a controlled apparatus, the supply or non-supply of a liquid to this pump giving rise to two different conditions in which it behaves as a transmission joint or respectively as an idle joint.

In general, where there is a motor is present oil (or another liquid) under pressure, which can be used for the control of the device according to the invention; however, because the device has, per se, the character of a volumetric pump, it can also suck the liquid controlling its operation.

Among the advantages of the device of the invention are to be remarked, in addition to the temporary stop of an apparatus during the periods of time in which its operation is not necessary, the already explicated fact that the engagement and the disengagement thereof take place in a gradual manner; the fact that for controlling the device can be used a liquid which in any event should be supplied to the controlled apparatus; the fact that the incompressibility of the liquid ensures a reliable operation; the possibility, in many cases, of incorporating the device into the controlled apparatus itself, thus reducing the encumbrance; and the aptitude of the device to correctly operate at the temperatures which usually are present in an automotive application.

Moreover, the device performs a "fuse" operation, in the sense that, in the case of an overload, it allows a sliding which preserves the component parts from excessive damages, though returning spontaneously to a normal operation when the overload has ceased. The device also protects the component parts from peaks of inverted torque, which can be produced by the engine in particular circumstances. In effect, in the presence of an inverted rotation, the inlet passages take the function of outlets and therefore allow evacuation of the liquid contained in the pumping chamber, whereby the device becomes an idle joint.

Although the invention has been described, by way of example, in its application to a vacuum pump, and with the incorporation of the device in the vacuum pump itself, it will be evident to those skilled in the art that the invention can be applied to other kinds of controlled apparatuses, and that it can be embodied in the form of a separate unit to be interposed between a motor means and an apparatus to be controlled.

It is to be understood that this invention is not limited to the embodiments which have been described and shown as examples. Several possible modifications have been mentioned in the description, and others are available to those skilled in the art. These modifications and others, as well as any replacement by technically equivalent means, may be applied to what has been described and represented, without departing from the spirit of this invention as defined by the appended Claims.

The invention claimed is:

1. A device for controlling the operation of a vacuum pump, comprising:
    a blade pump comprising a rotor having at least one blade, a rotary body housing said rotor, a pumping chamber defined by said rotary body, said pumping chamber having no fluid outlet other than by leakage at seals of said pumping chamber, one of the rotor and rotary body being adapted to connect to an input shaft to the vacuum pump and the other of the rotor and rotary body being adapted to connect to a rotor of the vacuum pump;
    and a liquid supply device adapted to supply a liquid to said pumping chamber, said liquid supply device being controllable between a first state in which said liquid supply device supplies liquid to the pumping chamber in an amount sufficient to fill the pumping chamber and a second state in which said liquid supply device supplies liquid to the pumping chamber in an amount insufficient to fill the pumping chamber, response to a determination of whether the vacuum pump is to be actuated.

2. The device according to claim 1, wherein said liquid supply device is adapted to supply liquid to the pumping chamber from outside of said pumping chamber under pressure.

3. The device according to claim 1, wherein the pumping chamber and the liquid supply device are configured to suck liquid into the pumping chamber by operation of the blade pump.

4. The device according to claim 1, wherein said device is incorporated into a vacuum pump.

5. The device according to claim 4, wherein the rotary body is rigidly connected to the rotor of the vacuum pump.

6. The device according to claim 4, wherein the rotary body is formed integrally with the rotor of the vacuum pump.

7. The device according to claim 1, further comprising passageways located to receive leakage from seals of said blade pump.

8. The device according to claim 1, further comprising a valve operable to interrupt supply of liquid to said pumping chamber.

9. A device according to claim 1, wherein said rotor comprises a single blade, and said pumping chamber has an interior contour corresponding to a trajectory of end portions of the blade during the rotation around the rotor axis, such that a constant clearance exists between the end portions of the blade and the interior contour of the pumping chamber.

* * * * *